Patented Sept. 12, 1933

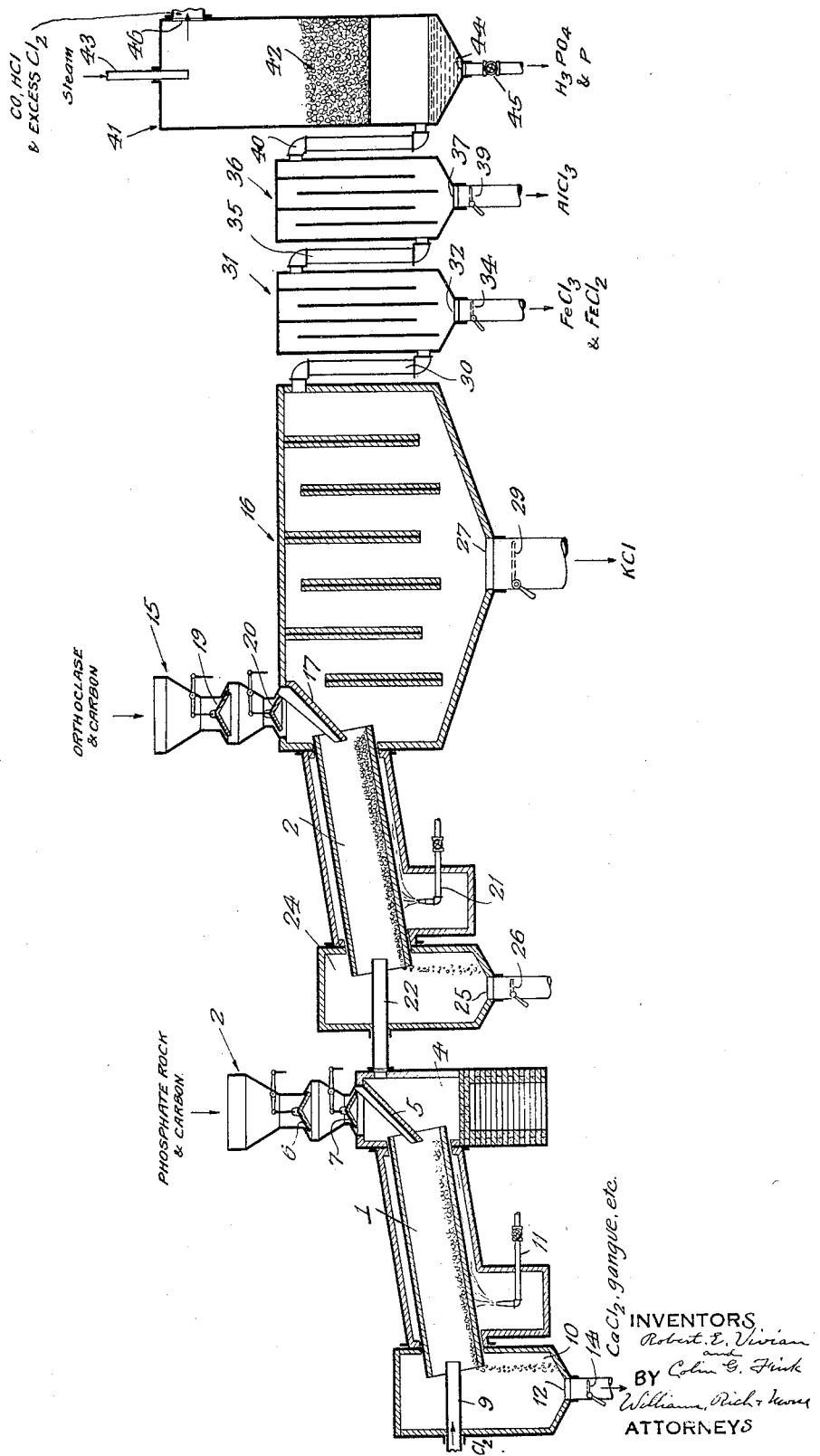

1,926,073

UNITED STATES PATENT OFFICE 1,926,073

COMBINED PROCESS OF EXTRACTING THE PHOSPHORUS CONTENT FROM PHOSPHORUS CONTAINING MATERIALS AND THE POTASSIUM CONTENT FROM POTASSIUM CONTAINING MATERIALS

Robert E. Vivian and Colin G. Fink, New York, N. Y., assignors to International Agricultural Corporation, New York, N. Y., a corporation of New York Application June 3, 1931. Serial No. 541,767

14 Claims. (Cl. 23—28)

The present invention relates to a combined process for the extraction of the phosphorus content from phosphorus-containing materials and of the potassium content from potassium-containing materials, and more particularly to a combined process wherein a chloride or chlorides of phosphorus are produced by chlorination of and volatilization from a phosphorus-containing material and potassium chloride is produced by chlorination of and volatilization from a potassium-containing material.

An object of this invention is to extract the phosphorus content from a phosphorus and oxygen containing material and the potassium content from a potassium and oxygen containing material, with more simplicity and economy than has been possible by hitherto proposed processes. The invention may be applied on the one hand to the treatment of phosphorus and oxygen containing materials, such as phosphate rock, the mineral apatite, aluminum and iron phosphate minerals, and on the other hand to the treatment of potassium and oxygen containing materials, such as the minerals orthoclase (feldspar), alunite, leucite, etc.

In accordance with the process of the present invention, a charge, consisting of a properly proportioned mixture of a phosphorus and oxygen containing material and carbon, is maintained at a suitable temperature in the presence of chlorine. The gaseous products formed in and liberated from said charge, including chloride or chlorides of phosphorus, are conducted to a second charge, consisting of a properly proportioned mixture of a potassium and oxygen containing material and carbon, which is also maintained at a suitable temperature. In view of the presence of the chloride or chlorides of phosphorus, which are strong chlorinating agents, the formation and volatilization of potassium chloride from the second mentioned charge is materially facilitated. Economy in the amount of chlorine to be used is also achieved. Other features and advantages of the present invention will become apparent in the following detailed description of the process claimed herein.

The present invention may utilize to advantage the process of producing chloride of phosphorus vapor disclosed and claimed in the co-pending application of Robert E. Vivian, Serial No. 541,765, filed simultaneously herewith. In accordance with that process, chloride or chlorides of phosphorus may be formed and volatilized in large amount with the charge of phosphorus and oxygen containing material and carbon maintained at a red heat or below red heat. A temperature of the order of from 600° to 800° C. may be utilized, but it has been found that maximum extraction of the phosphorus content may be obtained with the charge maintained at a temperature of from 700° to 800° C. It is believed that the phosphorus content in the charge is converted into phosphorus pentachloride, $PCl_5$, combined in varying proportions, depending upon the amount of chlorine used, with various other chlorides of phosphorus, such as phosphorus trichloride, $PCl_3$, and phosphorus oxychloride, $POCl_3$. If phosphate rock is treated for the extraction of its phosphorus content, aluminum chloride, $AlCl_3$, and ferric chloride, $FeCl_3$, are also produced as volatilized products, due to the presence of aluminum and iron in said phosphatic material. Still other products of the reaction or reactions which take place are calcium chloride, which, together with other matters, such as gangue and unreacted carbon, remain as the residue, and carbon monoxide, which escapes with the fumes or volatilized products. The reaction or reactions which take place are strongly exothermal. After the reaction or reactions have started, the heat added to the charge should therefore be suitably controlled.

The following equations are given as an indication of the character of the reactions which may be caused to take place:

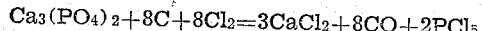

$$Ca_3(PO_4)_2 + 8C + 8Cl_2 = 3CaCl_2 + 8CO + 2PCl_5$$

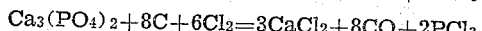

$$Ca_3(PO_4)_2 + 8C + 6Cl_2 = 3CaCl_2 + 8CO + 2PCl_3$$

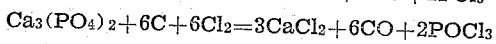

$$Ca_3(PO_4)_2 + 6C + 6Cl_2 = 3CaCl_2 + 6CO + 2POCl_3$$

When carrying out the process, it is preferred to utilize a slight excess of carbon over the theoretical amount indicated by the first mentioned equation. For example, a ratio of three parts by weight of calcium phosphate to one part by weight of carbon has been found to produce satisfactory results. When using phosphate rock for the extraction of its phosphorus content, this ratio is not materially altered, due to the comparatively small amounts of aluminum and iron in said phosphatic material.

It is believed that the process may be caused to volatilize phosphorus pentachloride, substantially uncombined with other chlorides of phosphorus, if there is used an amount of chlorine in excess of the theoretical amount indicated by the first mentioned equation. The employment of an excess of chlorine is in any event advantageous in that it forces the reaction or reactions toward completion, and a more rapid reaction or reactions occur with a sweeping out of the volatilized products as formed.

It being noted that the temperature of fusion of calcium chloride is 778° C., the residue formed by the reaction or reactions, consisting in large part of calcium chloride, is a partially fused or sintered material if the temperature is at or above the temperature of fusion of calcium chloride formed as a residue, and is a solid or unfused material, if the temperature employed is below this temperature of fusion. The character of this residue, particularly when unfused, permits the chlorine to penetrate easily within the charge and react thoroughly with the charge. It should be noted that the calcium chloride formed by the reaction or reactions is more or less combined with certain impurities, which are apt to cause its fusion point to differ somewhat from the fusion point (778° C.) of pure calcium chloride. Consequently, preferred temperatures for the working of the process are below the temperature of fusion of the calcium chloride as modified by its impurities in the residue formed by the reaction or reactions.

It is noted that, when treating phosphatic materials containing silica, such as phosphate rock, silica appears to enter only incidentally into the process as an impurity of said materials, its presence in the charge being apparently not required in the working of the process.

The calcium chloride which is produced as a residue may be fused and electrolyzed in the molten state, whereby chlorine is recovered for further use in the process and metallic calcium produced.

It is known that potassium chloride may be produced and volatilized by properly heating a properly proportioned mixture or charge of a potassium and oxygen containing material and carbon, and treating this charge with chlorine gas in proper amount. In accordance with the process of the present invention, the charge of potassium and oxygen containing material and carbon is treated in the presence of the gaseous products liberated from the charge of phosphorus and oxygen containing material and carbon and including chloride or chlorides of phosphorus, oxide of carbon and possibly other chlorides formed by reaction in said first charge, and also, if required, in the presence of chlorine, which may be excess chlorine also proceeding from said first charge. The large yield of potassium chloride may be due in part to the great activity of nascent chlorine, formed by decomposition of chloride or chlorides of phosphorus into lower chlorides and possibly into elemental phosphorus. The attack of nascent chlorine on oxides and metals is rapid and practically complete, particularly at temperatures above ordinary or room temperatures, so that in the process of the present invention the formation and volatilization of potassium chloride is materially facilitated. The large yield of potassium chloride is also believed to be due to the chloride or chlorides of phosphorus acting as chlorine carriers or catalysts of the reaction. It should also be mentioned that if other chlorides, such as aluminum chloride and ferric chloride, are present in the gaseous products conducted from the first charge to the second, the volatilization of potassium chloride will also be improved, as these other chlorides will also act as chlorine carriers or catalysts of the reaction, even though they are present in small amounts. Ferric chloride, FeCl$_3$, particularly, is very strongly reactive, its attack on metals or oxides being complete and rapid at temperatures above ordinary or room temperatures. It is also noted that in view of the reducing action of carbon monoxide present in the gaseous products conducted to the charge of potassium and oxygen containing material and carbon, economy is had in the carbon which needs to be supplied for said charge.

In the carrying out of the present process, the charge of potassium and oxygen containing material and carbon may be heated at a temperature below the atmospheric boiling point of potassium chloride. A temperature of the order from 900° to 1200° C. may be utilized, but it is believed that, in general, a maximum extraction of the potassium content may be obtained, with the charge heated at a temperature of from 1000° to 1200° C. for a suitable period of time. It is understood, however, that the process is not limited to these specific temperatures.

Other volatilized products, depending on the particular potassium and oxygen containing material used, are formed. For example, if orthoclase is treated for the extraction of its potassium content, aluminum chloride is formed and volatilized, due to the presence of aluminum in said material. Iron chloride is also formed and volatilized if the orthoclase used contains iron. Carbon monoxide is also liberated from the charge and escapes with the gaseous products. As in the treatment of the phosphatic material, the reaction or reactions are again strongly exothermal, control of the heat added to the charge to maintain it at a suitably low temperature being preferred. The following equation is given as an indication of the character of a reaction which may be caused to take place, when orthoclase having the composition K$_2$O.Al$_2$O$_3$.xSiO$_2$ is used as the potassium and oxygen containing material:

$$K_2O.Al_2O_3.xSiO_2 + 4C + 4Cl_2 = 2KCl + 2AlCl_3 + xSiO_2 + 4CO$$

It is noted that, while silica enters incidentally in the process as a constituent of the orthoclase, its presence in the charge is apparently not required in the working of the process.

In practice, it is preferred to utilize an excess of carbon over the theoretical amount indicated by the equation of the reaction. For example, a ratio of 4 to 5 parts by weight of orthoclase to 1 part by weight of carbon have been found to produce satisfactory results, when the theoretical amounts indicated by the equation of the reaction are approximately 7 parts by weight of orthoclase to 1 part by weight of carbon.

The amount of chlorine and chlorinating agents, with which the charge of potassium and oxygen containing material and carbon is treated, should be preferably in excess of that which is necessary to cause chlorine to combine with the various elements of the potassium and oxygen containing material capable of forming chlorides or oxy-chlorides therewith. The employment of this excess of chlorine and chlorinating agents is believed advantageous in that the reaction or reactions are forced toward completion, still more rapid a reaction or reactions taking place with a sweeping out of the volatilized products as formed. The residue formed, consisting essentially of silica, unreacted carbon and gangue, is much below the fusion point of its ingredients, and permits the chlorine and chlorine carriers to penetrate easily within the charge and react thoroughly therewith. The reactive constituents of the potassium and oxygen containing material treated are thus caused to combine quickly with the chlorine, and the volatilized products thus formed to be quickly drawn or swept away from the charge. The rapid reaction or reactions and the rapid flow of the volatilized products from the charge, which the process makes possible, is desirable in view of the high temperature of condensation of potassium chloride and the necessity of maintaining this product above its temperature of condensation before being discharged into a collecting apparatus.

In practice, each of the charges, consisting, in one instance, of phosphorus and oxygen containing material and carbon and, in the other instance, of potassium and oxygen containing material and carbon, may be either in the form of a finely divided mixture or in the form of briquets into which a finely divided mixture is pressed. The gaseous products which proceed from the charge of potassium and oxygen containing material and carbon include potassium chloride, chloride or chlorides of phosphorus and possibly elemental phosphorus, together with oxide of carbon and excess chlorine, and may also include aluminum chloride, and possibly ferric chloride and ferrous chloride, if either the phosphorus and oxygen containing material or the potassium and oxygen containing material treated contains iron. The various chlorides present may be collected in any suitable manner, as for instance by a Cottrell precipitator, and the mixed products thereafter separated by leaching and fractional crystallization. Or, the various chlorides, after leaving the charge of potassium and oxygen containing material and carbon, may be recovered by fractional condensation. The chlorides, other than the chloride or chlorides of phosphorus, may be separated from the gaseous products, and the remaining gaseous products, including chloride or chlorides of phosphorus, may be subjected thereafter to the action of steam whereby hydrochloric acid gas and phosphoric acid are produced, as will be hereinafter more particularly described. If elemental phosphorus has been produced, it is recovered with the phosphoric acid.

The remaining gases consist of oxide of carbon and excess chlorine, or, if phosphoric acid has been produced, oxide of carbon, excess chlorine and hydrochloric acid gas. Part or all of said excess chlorine and of said hydrochloric acid gas and as much as is practicable of said oxide of carbon should be preferably combined with chlorine for circulation in the apparatus in which the charges are heated. By utilizing the hydrochloric acid gas as a chlorinating agent and reutilizing the excess chlorine, an economy is had in the amount of chlorine to be supplied for use in the process. Also, in view of the reducing action of carbon monoxide, less carbon needs to be supplied for the charge of phosphorus and oxygen containing material and carbon or the charge of potassium and oxygen containing material and carbon.

In the drawing, there is schematically illustrated an apparatus which may be used for the production of phosphoric acid and potassium chloride from phosphate rock and the mineral orthoclase. It is understood that the illustration of this apparatus should not be interpreted as a limitation of the invention, as the invention may be utilized in connection with the treatment of other materials, and the process which will be presently described in connection with the apparatus shown may also be carried out in other apparatus. For example, the furnaces 1 and 2, in which the chlorination of the minerals takes place, are illustrated as of the rotary kiln type, although other furnaces may be utilized.

The charge, consisting of phosphate rock and carbon, is introduced into the kiln 1 through the hopper 2, located at the top of the chamber 4, a chute 5 being provided within said chamber 4 for directing the descending material, after leaving said hopper, into the open upper end of said kiln. The hopper 2 is fitted in the usual manner with two closures or valves 6 and 7, which are opened one after the other, when introducing the charge, to prevent access of air within the interior of the apparatus. Chlorine gas is supplied to the charge through a pipe 9 leading through a chamber 10 communicating with the open end of the kiln 1. Heat may be applied to the kiln 1 by means of an oil or gas burner 11.

As fresh material is fed through the kiln 1, the residue formed by the reaction or reactions, consisting essentially of calcium chloride, gangue and unreacted carbon, drops to the bottom of the chamber 10, where it collects and from which it may be removed through an orifice 12 controlled by a closure 14. After the reaction or reactions have started, the heat supplied by the burner 11 should be properly controlled, in view of the exothermal character of said reaction or reactions, the temperature of the charge being preferably maintained at a suitable temperature below the fusion temperature of the calcium chloride formed in the residue.

The charge, consisting of orthoclase and carbon, is introduced into the kiln 2 through a hopper 15, located at the top and at one side of a condenser or collecting apparatus 16, a chute 17 being provided within said apparatus 16 for directing the descending material, after leaving the hopper 15, into the open upper end of the kiln 2. The hopper 15 is also fitted with two closures or valves 19 and 20. Heat may be applied to the kiln 2 by means of an oil or gas burner 21. The volatilized products proceeding from the charge in the kiln 1, consisting chiefly of phosphorus chloride or chlorides, aluminum chloride and ferric chloride, together with excess chlorine and oxide of carbon, enter the chamber 4, from which they pass and are directed to the charge in the kiln 2 through a pipe 22 leading through a chamber 24 communicating with the open lower end of the kiln 2.

As new supply of material is fed into the kiln 2 from the hopper 15, the residue formed by the reaction or reactions, consisting essentially of silica, gangue and unreacted carbon, drops to the bottom of the chamber 24, where it collects and from which it may be drawn off through an orifice 25 controlled by a closure 26. The temperature of the charge may be maintained at a temperature of the order of from 1000° to 1200° C., the heat supplied by the burner 21 being suitably controlled in view of the exothermal character of the reaction or reactions.

The gaseous products proceeding from the charge in the kiln 2, consisting of chloride of potassium, chloride or chlorides of phosphorus, chloride of aluminum, ferric chloride or ferrous chloride or both ferric chloride and ferrous chloride, and possibly elemental phosphorus, together with excess chlorine and oxide of carbon, enter the condenser 16, which is maintained at the proper temperature to cause the condensation of potassium chloride. The latter product may be recovered through an orifice 27 controlled by a closure 29.

The gases, less the condensed potassium chloride, pass from the condenser 16 through a pipe 30 into another condenser 31, which is maintained at the proper temperature to cause the condensation of ferric chloride and ferrous chloride. The condensed chloride or chlorides of iron may be recovered through an orifice 32 controlled by a closure 34.

The remaining gases are led from the condenser 31 through a pipe 35 into another condenser 36, which is maintained at the proper temperature to cause the condensation of the chloride of aluminum. The latter product may be recovered through an orifice 37 controlled by a closure 39.

The remaining gases, consisting of chloride or chlorides of phosphorus, excess chlorine and oxide of carbon, and possibly elemental phosphorus, are led from the condenser 36 through a pipe 40 into a scrubbing tower 41 and below a bed of coke 42 supported therein in any appropriate manner. Steam is introduced through a pipe 43 into the tower 41 above the bed of coke 42, so that, upon passage of the gases upwardly through the bed, the chloride or chlorides of phosphorus react with the steam to form phosphoric acid and possibly other acids of phosphorus. Due to the presence of chlorine, these other acids of phosphorus may be converted into phosphoric acid. If elemental phosphorus is present in the gases leading to the tower 41, it will collect, with the acid or acids of phosphorus produced, at the bottom of the tower 41, the acid or acids of phosphorus and the elemental phosphorus, if formed, being drawn off through an orifice 44 controlled by a valve 45. Hydrochloric acid is also formed by reaction of the steam with the chloride or chlorides of phosphorus. The steam is supplied to the tower 41 at such pressure and temperature that its temperature when reacting is over the boiling point of hydrochloric acid and below the boiling point of phosphoric acid, whereby the hydrochloric acid escapes in gaseous form, with any excess chlorine and oxide of carbon, from the upper portion of the tower 41 through the pipe 46. Part or all of the excess chlorine and of the hydrochloric acid gas, which issue from the tower 41, and as much as is practicable of the oxide of carbon, which also issues from the tower 41, may be utilized to advantage for treatment of the charges in the kilns 1 and 2, by conducting them with the supply of chlorine to the kiln 1 through the pipe 9.

Metallic parts of the apparatus should be lined with a suitable refractory lining wherever the temperature of chlorine may be high enough to effect corrosive action, as is well understood in the art. In the drawing, the kilns 1 and 2, the chambers 4 and 24, and the condenser 16 are shown provided with such lining, although it is understood that other surfaces requiring protection against the corrosive action of heated chlorine may be lined in like manner.

In the claims, the term "calcium phosphate" includes any substance in which calcium phosphate is present.

What is claimed is:

1. The process of treating potassium and oxygen containing material consisting in heating such material and carbon in the presence of chloride of phosphorus vapor, whereby potassium chloride vapor is formed.

2. The process of treating potassium and oxygen containing material consisting in heating such material and carbon, maintained at a temperature of the order of from 1000° to 1200° C., in the presence of chloride of phosphorus vapor and nascent chlorine gas, whereby potassium chloride vapor is formed.

3. The process of treating phophorus and oxygen containing material and potassium and oxygen containing material consisting in heating such phosphorus and oxygen containing material and carbon in the presence of chlorine whereby chloride of phosphorus vapor is formed, and heating such potassium and oxygen containing material and carbon in the presence of said chloride of phosphorus vapor whereby potassium chloride vapor is formed.

4. The process of treating calcium phosphate and potassium and oxygen containing material consisting in heating such calcium phosphate and carbon in the presence of an excess of chlorine whereby chloride of phosphorus vapor is formed, and heating such potassium and oxygen containing material and carbon in the presence of said chloride of phosphorus vapor admixed with excess chlorine whereby potassium chloride vapor is formed.

5. The process of treating calcium phosphate and potassium and oxygen containing material consisting in heating such calcium phosphate and carbon in the presence of an excess of chlorine whereby gaseous products including oxide of carbon and chloride of phosphorus are formed, and heating such potassium and oxygen containing material and carbon in the presence of said gaseous products admixed with excess chlorine whereby potassium chloride vapor is formed.

6. The process of treating potassium and oxygen containing material and phosphorus and oxygen containing material also containing iron, consisting in heating such phosphorus and oxygen containing material and carbon in the presence of chlorine whereby gaseous products including chloride of phosphorus and chloride of iron are formed, and heating such potassium and oxygen containing material and carbon in the presence of said gaseous products whereby potassium chloride vapor is formed.

7. The process of treating phosphate rock and potassium and oxygen containing material, consisting in heating phosphate rock and carbon in the presence of an excess of chlorine whereby gaseous products include chloride of phosphorus, chloride of iron, chloride of aluminum and oxide of carbon are formed, and heating such potassium and oxygen containing material and carbon in the presence of said gaseous products admixed with excess chlorine whereby potassium chloride vapor is formed.

8. The process of treating calcium phosphate and potassium and oxygen containing material, comprising heating a charge consisting of such calcium phosphate and carbon in the presence of chlorine whereby gaseous products including chloride of phosphorus are formed, heating a second charge consisting of such potassium and oxygen containing material and carbon in the presence of said gaseous products whereby other gaseous products including potassium chloride are formed, and separating chloride of phosphorus and potassium chloride from the gases proceeding from said second charge.

9. The process of treating calcium phosphate and potassium and oxygen containing material, comprising heating a charge consisting of such calcium phosphate and carbon in the presence of an excess of chlorine whereby gaseous products including oxide of carbon and chloride of phosphorus are formed, heating a second charge consisting of such potassium and oxygen containing material and carbon in the presence of said gaseous products and chlorine proceeding from said first charge whereby other gaseous products including oxide of carbon and potassium chloride are liberated, separating chloride of phosphorus and potassium chloride from the combined gaseous products proceeding from said second charge, and returning and utilizing in said heating treatments oxide of carbon and excess chlorine delivered from said separation.

10. The process of treating calcium phosphate and potassium and oxygen containing material, comprising in heating a charge consisting of such calcium phosphate and carbon in the presence of an excess of chlorine whereby gaseous products including chloride of phosphorus are formed, heating a second charge consisting of such potassium and oxygen containing material and carbon in the presence of said gaseous products admixed with chlorine whereby other gaseous products including potassium chloride and phosphorus are formed, and separating chloride of phosphorus, potassium chloride and phosphorus from the gases proceeding from said second charge.

11. The process of treating calcium phosphate and potassium and oxygen containing material, comprising heating a charge consisting of such calcium phosphate and carbon in the presence of chlorine whereby gaseous products including chloride of phosphorus are formed, heating a second charge consisting of such potassium and oxygen containing material and carbon in the presence of said gaseous products whereby other gaseous products including potassium chloride are formed, separating potassium chloride from the gases proceeding from said second charge, and treating resulting gases including chloride of phosphorus with steam whereby acid of phosphorus is produced.

12. The process of treating calcium phosphate and potassium and oxygen containing material, comprising heating a charge consisting of such calcium phosphate and carbon in the presence of chlorine whereby gaseous products including chloride of phosphorus are formed, heating a second charge consisting of such potassium and oxygen containing material and carbon in the presence of said gaseous products whereby other gaseous products including potassium chloride and phosphorus are formed, separating potassium chloride from the gases proceeding from said second charge, and treating the resulting gases including phosphorus and chloride of phosphorus with steam whereby phosphoric acid and liquid phosphorus are recovered.

13. The process of treating phosphate rock and orthoclase, comprising heating a charge consisting of phosphate rock and carbon in the presence of an excess of chlorine whereby gaseous products including oxide of carbon, chloride of iron, chloride of aluminum, and chloride of phosphorus are formed, heating a second charge consisting of such potassium and oxygen containing material and carbon in the presence of said gaseous products and chlorine proceeding from said first charge whereby other gaseous products including oxide of carbon, chloride of aluminum and chloride of potassium are formed, and recovering chloride of potassium, chloride of iron, chloride of aluminum, and chloride of phosphorus from the gases proceeding from said second charge.

14. The process of treating phosphate rock and orthoclase, comprising heating a charge consisting of phosphate rock and carbon in the presence of an excess of chlorine whereby gaseous products including oxide of carbon, chloride of iron, chloride of aluminum and chloride of phosphorus are formed, heating a second charge consisting of orthoclase and carbon in the presence of said gaseous products and chlorine proceeding from said first charge whereby other gaseous products including oxide of carbon, chloride of aluminum, chloride of potassium and phosphorus are produced, and recovering chloride of potassium, chloride of iron, chloride of aluminum, chloride of phosphorus and phosphorus from the gases proceeding from said second charge.

ROBERT E. VIVIAN.
COLIN G. FINK.